UNITED STATES PATENT OFFICE.

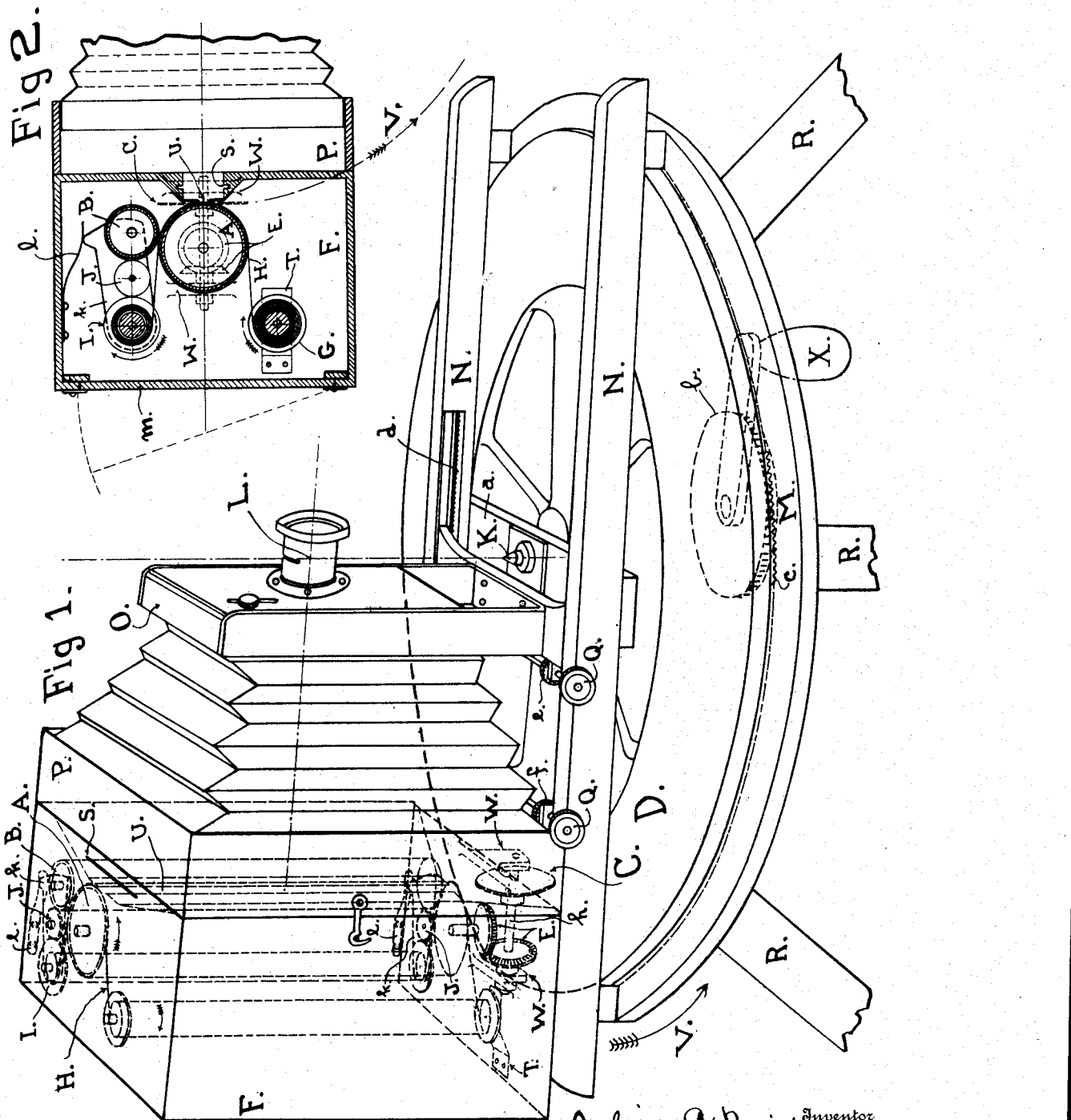

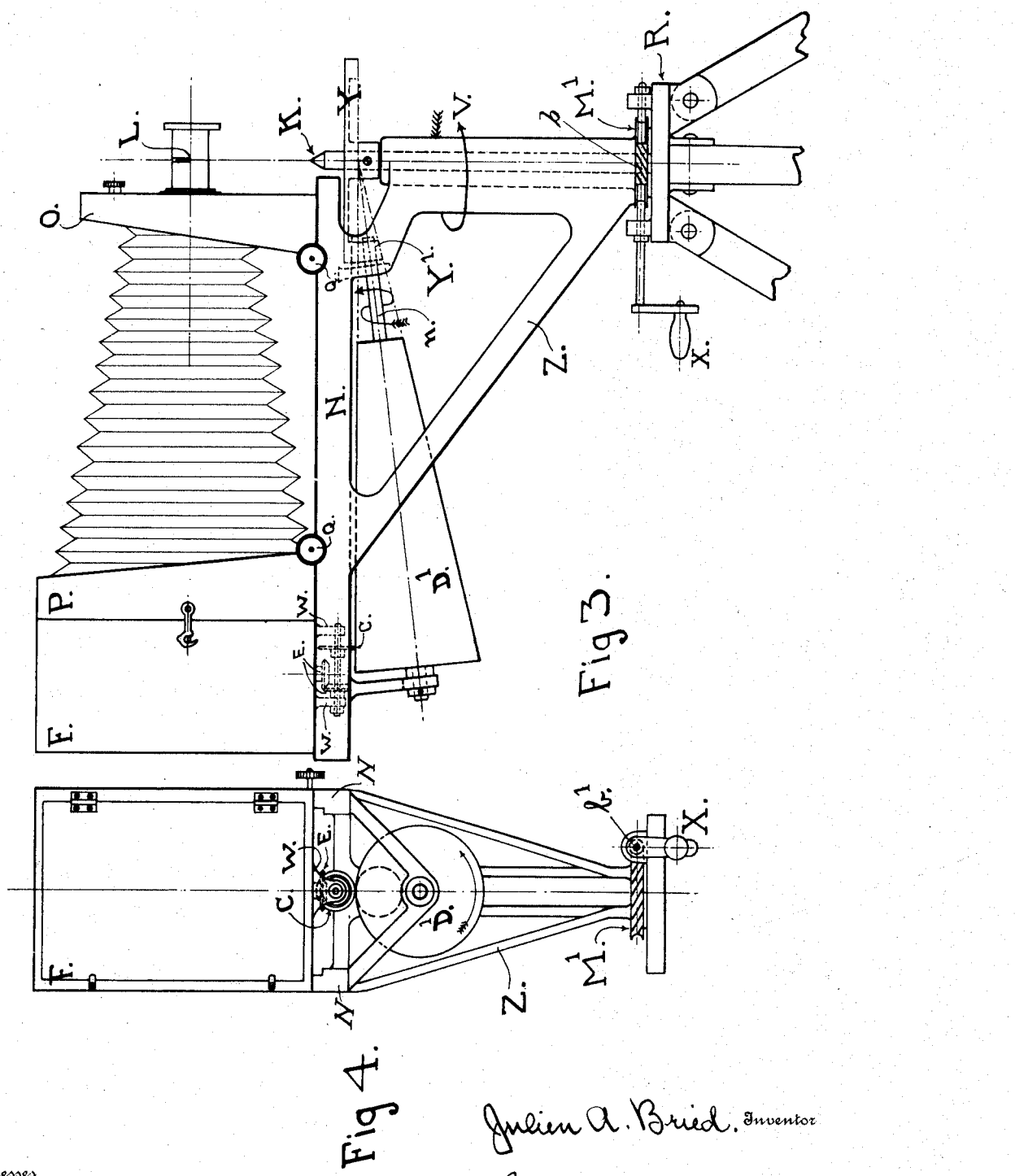

JULIEN A. BRIED, OF SAN FRANCISCO, CALIFORNIA.

PANORAMIC CAMERA.

No. 812,163.   Specification of Letters Patent.   Patented Feb. 6, 1906.

Application filed August 9, 1904. Serial No. 220,126.

*To all whom it may concern:*

Be it known that I, JULIEN A. BRIED, a citizen of the United States, residing at San Francisco, in the county of San Francisco and State of California, have invented certain new and useful Improvements in Panoramic Cameras, of which the following is a specification.

My invention relates to improvements in panoramic photograph-cameras of the revolving type, the object of my invention being to provide an apparatus for panoramic photography by which there may be obtained a very sharply defined picture and which will admit of a single negative being taken of the surrounding objects through a complete circle.

The present apparatus has been invented by me for the purpose of taking negatives to be subsequently greatly enlarged by a process which forms the subject of a separate application, filed June 8, 1904, Serial No. 211,629. By means of said process negatives can be successfully enlarged to as much as fifty times their original size.

By my present invention I have succeeded in taking panoramic views by an apparatus in which the movement of the film is at all times exactly equal to that of the image, however much the focal length may be varied.

Other improvements will appear in the further description of the invention.

In the accompanying drawings, Figure 1 is a perspective view of a camera embodying my invention. Fig. 2 is a horizontal section through the rollers. Fig. 3 is a side elevation, and Fig. 4 is a plan view, of a modified form of the invention.

Referring to the drawings, R represents a tripod-stand supporting a stationary annular table D and having a central pivot-pin K. Upon said pin K is pivoted the cross-bar $a$ of a frame comprising side guides N and an annular rim M. Said frame is caused to rotate about the annular table D by any suitable mechanism, and for the purpose of illustration I have herein shown it as rotated by means of a gear-wheel $b$, driven by a crank X and meshing with internal gear-teeth $c$, formed on the inner side of the rim M.

O is the front section of the camera, which is adjustably mounted by a rack $d$ and pinions $e$ (only one here shown) upon the guides N, so that it can be accurately adjusted in such position that the optical center of the lens L is immediately over the pivot K. P represents the rear section of the camera, which is adjusted to obtain the proper focus upon the film by means of pinions $f$ upon said racks $d$. Said pinions $e$ and $f$ are operated by hand-wheels Q.

F is the film-holder, in the front wall of which is a narrow aperture U, through which the light is admitted from the lens. Said light so admitted falls onto a film H, which passes in front of a roller A and is fed from a supply-spool G onto a winding-spool I.

The roller A is driven by means of miter-gears E, meshing with each other, one of which is on the lower end of the shaft of said roller A and the other is on a horizontal shaft $h$, journaled in bearings W, depending from the bottom of the holder F, said shaft $h$ carrying a disk C, having a milled periphery engaging the annular table D. This shaft $h$ is accurately mounted with reference to the roller A, so that the line of rolling of the disk C is exactly under that part of the film H which lies in the plane through the shaft of said roller A and the center of the lens, and the diameters of the gears E being equal the diameter of the disk C is made equal to that of the roller A, and it then results that the velocity backward of that small portion of the film which is opposite to the aperture U, imparted thereto by its motion around the roller A, is equal to its velocity forward due to the motion of the camera as a whole, and therefore said film is stationary with reference to the field at the time that it is exposed, so that a well-defined negative can be taken thereon. Moreover, by this construction this result of obtaining a stationary exposed portion of the film will be achieved whatever changes be made in focusing the camera, for if when focusing the film is moved to or from the optical center then the disk C will also correspondingly move to or from the center of rotation—the pivot K—and although its velocity will be diminished or increased by being nearer to or farther from the center of rotation, yet the velocity of the film will be correspondingly diminished or increased, since it is driven from the disk C so as to have the same linear velocity as the periphery of the disk C. By this construction, therefore, there is obtained an absolutely-stationary exposure of the film, permitting of obtaining an accurate image of the field on the film.

One of the greatest difficulties in obtaining negatives which can be enlarged many times— that is, in obtaining very sharp negatives—has been the difficulty of preserving a perfectly smooth surface in the film while moving it, especially with rapidity. In the "rubber-neck" class of camera, in which the film is bent concavely into an arc of a circle and a tube excluding the light, except from a small portion of the film, is caused to swing over said film, this difficulty has also been encountered on account of the difficulty of drawing such film into a concave form in the concave holder, so that it will not buckle. To obtain a smooth surface in a revolving camera as heretofore constructed was difficult on account of the vibration imparted to the film by the rapid motion. I overcome this difficulty by supporting the film against the roller A and giving it a firm convex support thereon by winding it from the supply-spool G, where the spring T acts as a brake. It is true that this construction results in the film being of convex form on the side exposed to the light; but this objection is only theoretical and of no practical importance in the present construction on account of the fact that the aperture U is so small (about one-tenth of the diameter of the roller A) and the portion of the film exposed to the light is so narrow that for all practical purposes the portion of the film exposed to the light is a plane surface. The film now lies perfectly smooth and flat upon the roller, and a smooth surface being presented to the rays of light a sharp negative is obtained. The slack film after passing the driving-rollers A and B is taken up on the receiving-spool I in the following manner: A supplemental driving-roller B has the ends of its shaft mounted in arms $k$, which swing from the center of the shaft of the spool I and are pressed toward the roller A by the springs $l$. Both the supplementary driving-roller B and the roller A are rubber or frictionally surfaced. The film passes between said rollers A and B, and the roller B being thus held firmly up against said film by the pressure of the springs $l$ is rotated from the roller A. It thus imparts rotation to the friction-wheels J, which are mounted in said arms $k$, and these wheels again impart rotation to the spool I, winding up the film on said spool. The dimensions of the roller B, the wheels J, and the flanges of the spool I are such that said spool I is driven somewhat faster than would take up the film H as it arrives from the roller A, and this insures all the slack film being taken up, after which the friction-wheels J will slip.

S is a slot in the frame of the holder of the camera, through which a slide is placed to shut off the light when removing the holder. The film can be removed from the holder by opening the door $m$ at the rear. The arrow V shows the direction of motion of the camera with this arrangement of gears and rolls.

In Figs. 3 and 4 is illustrated a modified form of my invention. In this modification, V represents a fixed shaft upon which is secured a bracket Z, having a long vertical bearing on said shaft and carrying at its lower end a worm-wheel M', driven by a worm $b'$, operated by a handle X. This bracket carries the side pieces N, on which are mounted in like manner as in the first modification the front and rear sections of the camera. The construction of the camera is the same as in the first modification; but the milled wheel C, instead of being driven by contact with the annular table D, as in the first modification, is now driven by a cone D' on a shaft $n$, having at its inner end a bevel-pinion Y' meshing with a fixed bevel or crown wheel Y, fixedly secured upon the shaft K. It will be seen that as the bracket revolves in one direction the cone revolves in the opposite direction on account of the engagement of the bevel-pinion Y' with a bevel-gear Y. To insure that the film shall travel backward in front of the aperture U as fast as it travels forward, due to the motion of the camera as a whole, it is only necessary to give the proper dimensions to the diameter of the roller A, gears E, disk C, angle of the cone D', and diameters of the pinion Y' and gear Y. Smoother action is obtained by making gears Y and Y' with a frictional surface instead of teeth. In the present instance the roller A, gears E, and disk C are given the same dimensions as before, and the required velocity is obtained by giving the proper dimensions to the other named elements. It will be seen that the construction of the modification operates on the same principle as that of the form first described. The cone may be considered as a sector of the table rolled up.

I claim—

1. In an apparatus of the character described, the combination of a camera-frame, a lens, means for rotating the frame about a vertical axis through the optical center of the lens, a film-support, mechanism for moving a film over said support in the direction opposite to its movement due to the rotation of the frame about said vertical axis, a revolving wheel carried on the camera-frame and operatively connected with said mechanism to move the film backward, and an element with which said wheel engages to impart revolution to said wheel from the rotation of the camera-frame, the speed so imparted to said wheel varying directly as the distance from said vertical axis, substantially as described.

2. In an apparatus of the character described, the combination of a camera-frame, a lens, means for rotating said frame about a vertical axis through the optical center of the lens, a film-support, means for moving a film over said support, in the direction opposite to its movement due to the rotation of the frame about said vertical axis, a wheel for operating said moving film, and an element having a surface with which said wheel is in frictional contact, said surface being one of revolution about a point in said vertical axis, whereby the velocity of said wheel varies as its distance from the vertical axis, substantially as described.

3. In an apparatus of the character described, the combination of a camera-frame, a lens, means for rotating the frame about a vertical axis through the optical center of the lens, a film-support, means for moving a film in the direction opposite to its motion due to the rotation of the frame about said vertical axis, said means comprising a vertical shaft, a horizontal shaft, bevel-gears on said shafts meshing with each other, a friction-disk on said horizontal shaft, and an element having a surface of revolution about a point in said vertical axis as center, with which element the friction-disk has frictional engagement to rotate the disk by the revolution of the camera-frame, substantially as described.

4. In an apparatus of the character described, the combination of a camera-frame, a lens, means for rotating the frame about a vertical axis through the optical center of the lens, a film-holder carried on said frame, supply and winding rollers in said film-holder, a roller over which said film is passed, means for driving said latter roller, including a horizontal shaft, bevel-gears on said shaft and on the shaft of the roller, a disk on said horizontal shaft, and an element having a surface of revolution about a point in said vertical axis as center with which said disk has engagement, to revolve the disk as the camera-frame rotates, substantially as described.

5. In an apparatus of the character described, the combination of a camera-frame, a lens means for rotating the frame about a vertical axis through the optical center of the lens, a film-holder, supply and winding spools therein, a roller over which said film passes, a pressure-roller, resilient means for pressing said pressure-roller against said first roller, and means operated by the revolution of the camera-frame for revolving said first roller in a direction so that the film travels thereover in the direction opposite to its motion due to the camera-frame as a whole, substantially as described.

6. In an apparatus of the character described, the combination of a camera-frame having an aperture, a lens, means for rotating said frame about a vertical axis through the optical center of the lens, a film-holder carried on the camera-frame, a roller in said film-holder over which the film passes and whose axis is in the plane of the middle of the aperture and lens, means for revolving the roller in a direction so that the film passes thereover in a direction opposite to that due to the motion of the camera-frame, supply and winding spools, and a braking device for the supply-spool whereby the film is maintained tight over the roller, substantially as described.

In witness whereof I have hereunto set my hand in the presence of two subscribing witnesses.

JULIEN A. BRIED.

Witnesses:
FRANCIS M. WRIGHT,
NELLE M. HARDING.